(12) United States Patent
Ishikawa et al.

(10) Patent No.: US 6,819,066 B2
(45) Date of Patent: Nov. 16, 2004

(54) ELECTRIC MOTOR VEHICLE

(75) Inventors: Tetsuhiro Ishikawa, Nishikamo-gun (JP); Yoshitaka Asakura, Toyohashi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/307,949

(22) Filed: Dec. 3, 2002

(65) Prior Publication Data

US 2003/0111971 A1 Jun. 19, 2003

(30) Foreign Application Priority Data

Dec. 13, 2001 (JP) ........................................ 2001-379448

(51) Int. Cl.[7] ................................................ H02P 1/00
(52) U.S. Cl. ........................ 318/139; 318/514; 318/471
(58) Field of Search .................... 338/59, 328; 324/551, 324/509; 318/139, 514, 471

(56) References Cited

U.S. PATENT DOCUMENTS 5,196,822 A * 3/1993 Gallusser et al. ........... 338/328
6,100,702 A * 8/2000 Hagen et al. ............... 324/551
6,340,927 B1 * 1/2002 Peschl ......................... 338/59

FOREIGN PATENT DOCUMENTS

| JP | 4-4761 A | 1/1992 |
| JP | 8-192639 A | 7/1996 |
| JP | 2000-92605 A | 3/2000 |
| JP | 2001-119815 A | 4/2001 |

* cited by examiner

Primary Examiner—Karen Masih
(74) Attorney, Agent, or Firm—Kenyon & Kenyon (57) ABSTRACT

An electric motor vehicle includes a battery that serves as a driving source for generating electric power, a pair of positive and negative electrode portions respectively connected to a positive electrode and a negative electrode of the battery, a resistor formed of a resistive material, and a first and a second contact portions connected to the resistor. The first and the second contact portion face the positive electrode portion and the negative electrode portion, respectively. The resistor is kept insulated from the battery in a normal operation state of the electric motor vehicle. At least one of the positive electrode, the first contact portion, the negative electrode and the second contact portion is displaced owing to an external force applied to the electric motor in an abnormal operation state such that the electrodes are in contact with their respective contact portions and the positive electrode and the negative electrode are short circuited in an abnormal operation state.

17 Claims, 6 Drawing Sheets

ELECTRIC MOTOR VEHICLE

INCORPORATION BY REFERENCE

This disclosure of Japanese Patent Application No. 2001-379448 filed on Dec. 13, 2001 including the specification, drawings and abstract is incorporated herein by reference in its entirety.

BACKGROUND OF THE INVENTION

1. Field of Invention

The invention relates to an electric motor vehicle, and more particularly to a technique for improving safety of an electric motor vehicle.

2. Description of Related Art

There is a known a system for assuring safety in the event of an accident of an electric motor vehicle which runs on power supplied from a battery like a fuel cell, such as disclosed in Japanese laid-open Patent Publication No. 2001-119815. The system disclosed in this publication is adapted to stop supplying hydrogen to a fuel cell in the event of an accident. Also, Japanese laid-open Patent Publication No. 8-192639 discloses an energy absorbing material and a structure of a battery case which absorb impact energy generated in an accident.

In an electric motor vehicle including a fuel cell, it is necessary to prevent electric shocks to humans due to electric power stored in the fuel cell, and the like, in the event of an accident of the motor vehicle. It is not easy for the related conventional safety systems or methods for an electric motor vehicle to realize protection of energy stored in the battery or safe and reliable consumption thereof in the event of the accident.

SUMMARY OF THE INVENTION

It is therefore an object of the invention to provide an electric motor vehicle capable of assuring safe consumption of electric power stored in a battery of an electric motor vehicle in the event of an accident such as a vehicle collision.

According to an embodiment of the invention, an electric motor vehicle is provided with a power source that serves to drive the electric motor vehicle, and a power consuming device that causes electricity generated by the power source to be consumed upon exertion of an impact to the electric motor vehicle owing to a collision of the electric motor vehicle.

Thus, the electric power of the vehicle power source is forcibly consumed in the event of an accident such as a vehicle collision to prevent electric shock to humans after the collision. Also, the structure of the embodiment can be simplified, requiring only one forcible discharging device for one vehicle power source.

In the following description, "an electric motor vehicle" is not limited, in its definition, to a motor vehicle that uses electric power supplied from the battery as a driving power source, but includes a so-called hybrid vehicle including a motor or motors driven by electric power and a gasoline engine as power sources for driving the motor vehicle.

According to the embodiment, the power source is a battery formed by connecting a plurality of unit cells.

The power consuming device is provided at a position within the electric motor vehicle so as to prevent the power consuming device from being accessed from one of inside and outside of the electric motor vehicle.

The power source includes a fuel cell, the power consuming device has a stack case formed of a resistor for housing the fuel cell. When the fuel cell is brought into contact with the stack case owing to the collision of the electric motor vehicle, electricity generated by the fuel cell is consumed by a resistance of the stack case.

The power source includes a secondary battery, the power consuming device includes an electrical resistance. When the secondary battery is brought into contact with the electrical resistance owing to the collision of the electric motor vehicle, electricity generated by the secondary battery is consumed.

A contact portion at which the fuel cell and the stack case contact is located closer to the fuel cell than a switching device that interrupts connection between the fuel cell and a load connected to the fuel cell in case of the collision of the electric motor vehicle.

A contact portion at which the secondary battery and the electrical resistance contact is located closer to the secondary battery than a switching device that interrupts connection between the secondary battery and a load connected to the secondary battery in case of the collision of the electric motor vehicle.

According to an embodiment of the invention, an electric motor vehicle is provided with a battery that serves as a driving source for generating electric power, a pair of positive and negative electrode portions respectively connected to a positive electrode and a negative electrode of the battery, a resistor formed of a resistive material, and a first and a second contact portions connected to the resistor, the first and the second contact portion facing the positive electrode portion and the negative electrode portion, respectively. The resistor is kept insulated from the battery in a normal operation state of the electric motor vehicle. At least one of the positive electrode, the first contact portion, the negative electrode and the second contact portion are displaced owing to an external force applied to the electric motor in an abnormal operation state such that the electrodes are in contact with their respective contact portions and the positive electrode and the negative electrode are short circuited in an abnormal operation state.

An electric motor vehicle according to a further embodiment includes a battery case that houses the battery, wherein the battery case is formed of a resistor.

The positive electrode portion, negative electrode portion, the first contact portion and the second contact portion are housed in the battery case, and provided in one of a front, a side, and a rear direction of the electric motor vehicle.

The positive electrode portion, negative electrode portion, the first contact portion and the second contact portion is provided on a front portion of the electric motor vehicle.

The battery is formed by stacking a plurality of unit cells. The unit cell is formed of an anode, cathode, and an electrolyte interposed therebetween. Each side of the stacked plurality of unit cells is sandwiched by conductive end plates. The positive electrode portion and the negative electrode portion are connected to the end plates at each side of the positive electrode and the negative electrode.

BRIEF DESCRIPTION OF THE DRAWINGS

The above-mentioned exemplary embodiment and other exemplary embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF PREFERRED EMBODIMENTS

In the following description, some exemplary embodiments of the invention will be described in detail with reference to the accompanying drawings.

Figure 1:
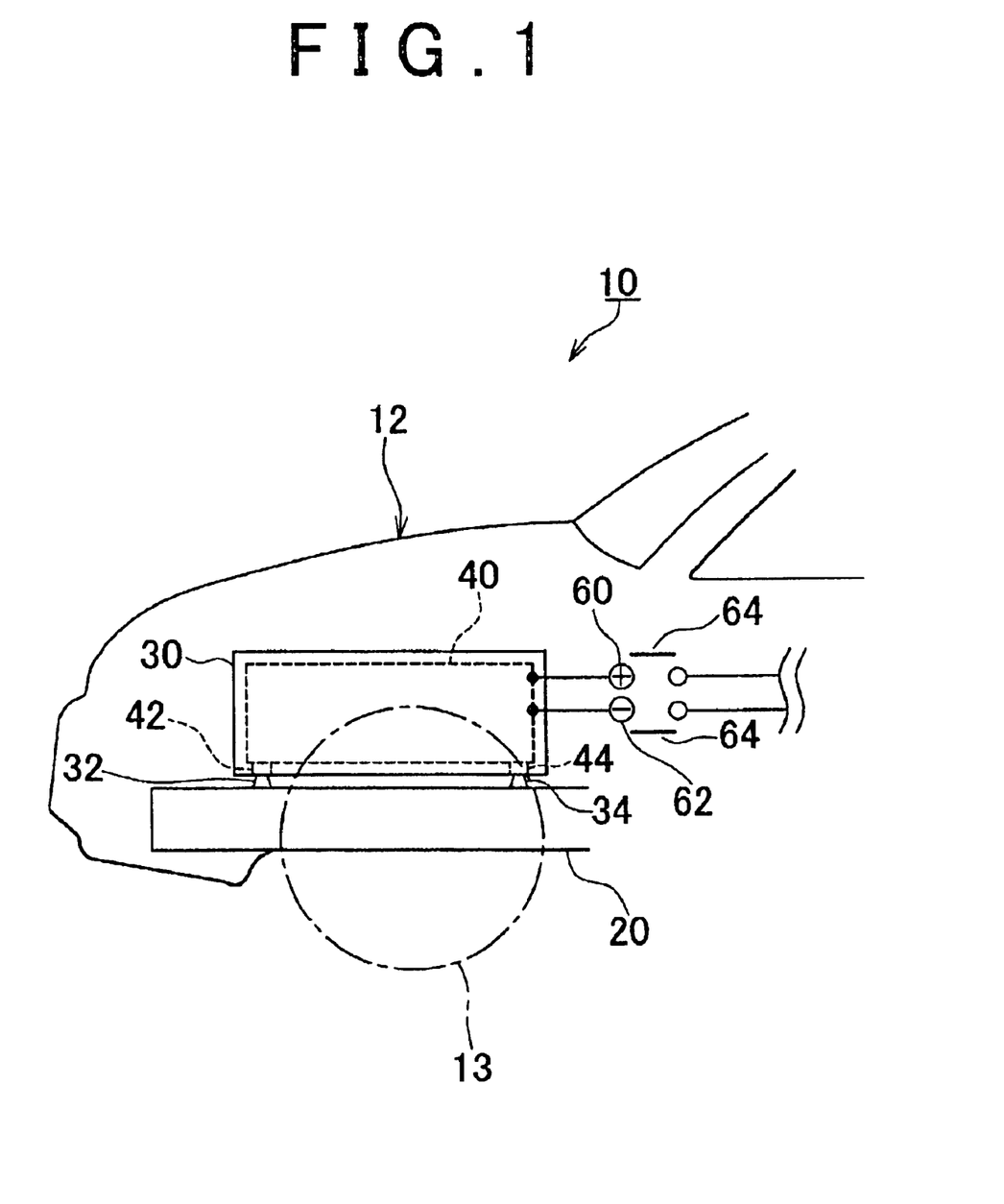
FIG. 1 is a view showing a construction of a front portion 12 of an electric motor vehicle 10 according to one embodiment of the invention.

FIG. 1 is a view showing a construction of a front portion 12 of an electric motor vehicle 10. The front portion 12 includes a chassis frame 20 on which a battery case 30 formed of electrically resistive material is mounted via case mounts 32, 34 (and another two case mounts which are not shown in the figure, that is, a total of 4 case mounts are used). In the battery case 30, a fuel cell 40 (a fuel cell will be treated as one type of an available battery in the following description) is mounted via battery mounts 42, 44 (and another two battery mounts which are not shown in the figure, that is, a total of 4 battery mounts are used). Each battery mount 42 or 44 is of sufficient strength to support the fuel cell 40 when the motor vehicle is running in a normal state (i.e., a safe state). As shown in FIG. 1, a positive cable 60 and a negative cable 62 extend out from the fuel cell 40. The cables 60, 62 are connected to a load such as a motor (not shown) mounted on the electric motor vehicle 10 via system main relays 64 so that electric power generated in the fuel cell 40 is consumed by the load. Each system main relay 64 is adapted to disconnect the positive cable 60 or the negative cable 62 from the load such as a motor when it is determined that a magnitude of an impact exerted to the electric motor vehicle is equal to or greater than a predetermined value on the basis of signals from an impact sensor (not shown) provided in the electric motor vehicle 10. A circle drawn by a dotted line represents a front wheel 13.

Figure 2:
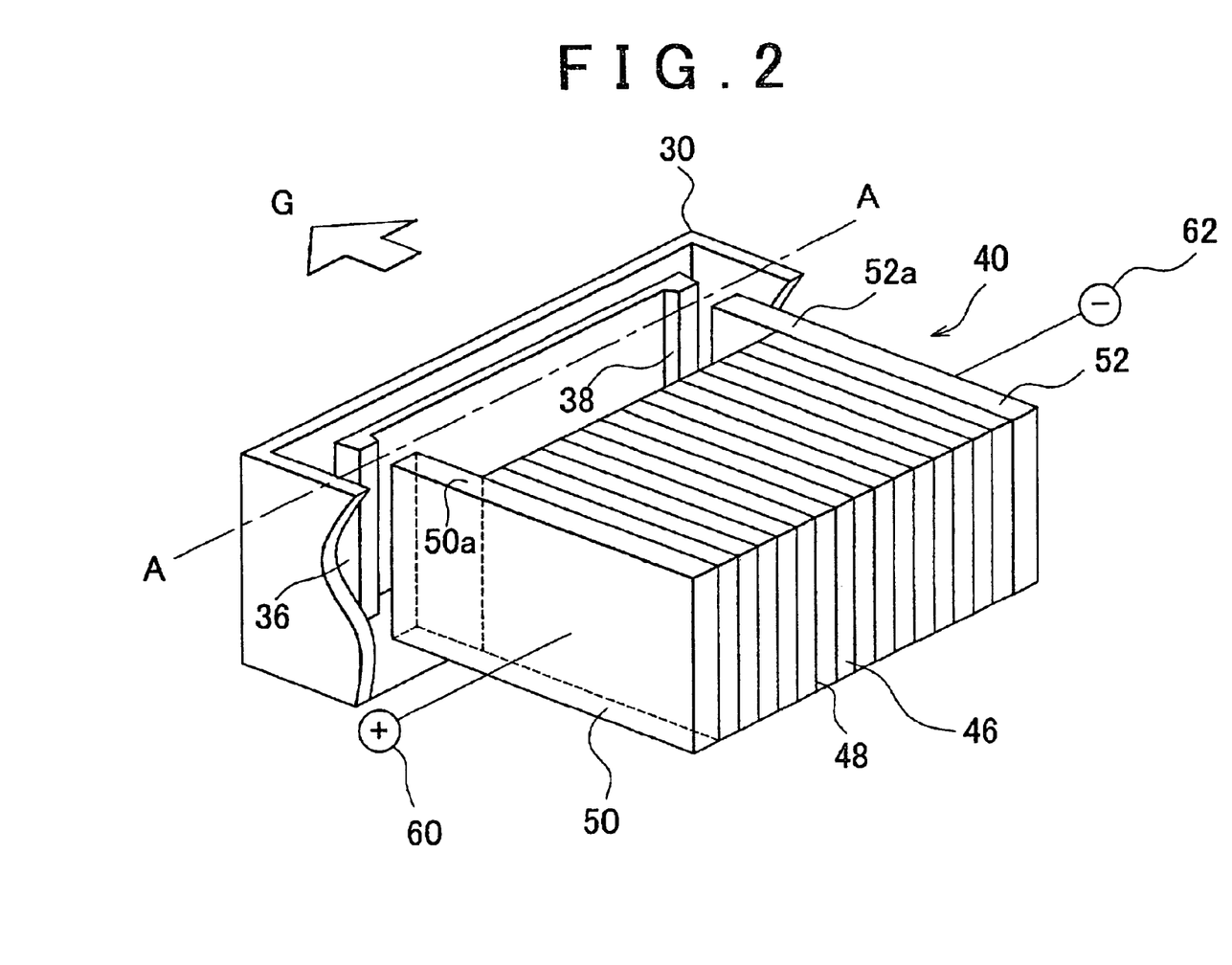
FIG. 2 is a perspective view showing a battery case 30 and a fuel cell 40 housed therein.

Next, FIG. 2 is a perspective view of the battery case 30 and the fuel cell 40 housed therein. The fuel cell 40 is formed by stacking a plurality of unit cells 46 each having a separator 48 interposed therebetween, and sandwiching the stacked unit cells from both sides between conductive end plates 50, 52, respectively. The positive and negative cables 60, 62 extend from those two end plates 50, 52, respectively. In a normal state, the fuel cell 40 is insulated from the battery case 30. When it is determined that the magnitude of the impact exerted to the electric motor vehicle 10 is equal to or greater than a predetermined value on the basis of the signals of the impact sensor, a switching valve (not shown) disposed in a fuel supply line through which fuel such as hydrogen is supplied to the fuel cell 40 is closed such that the fuel supply to the fuel cell 40 is interrupted.

Figure 3:
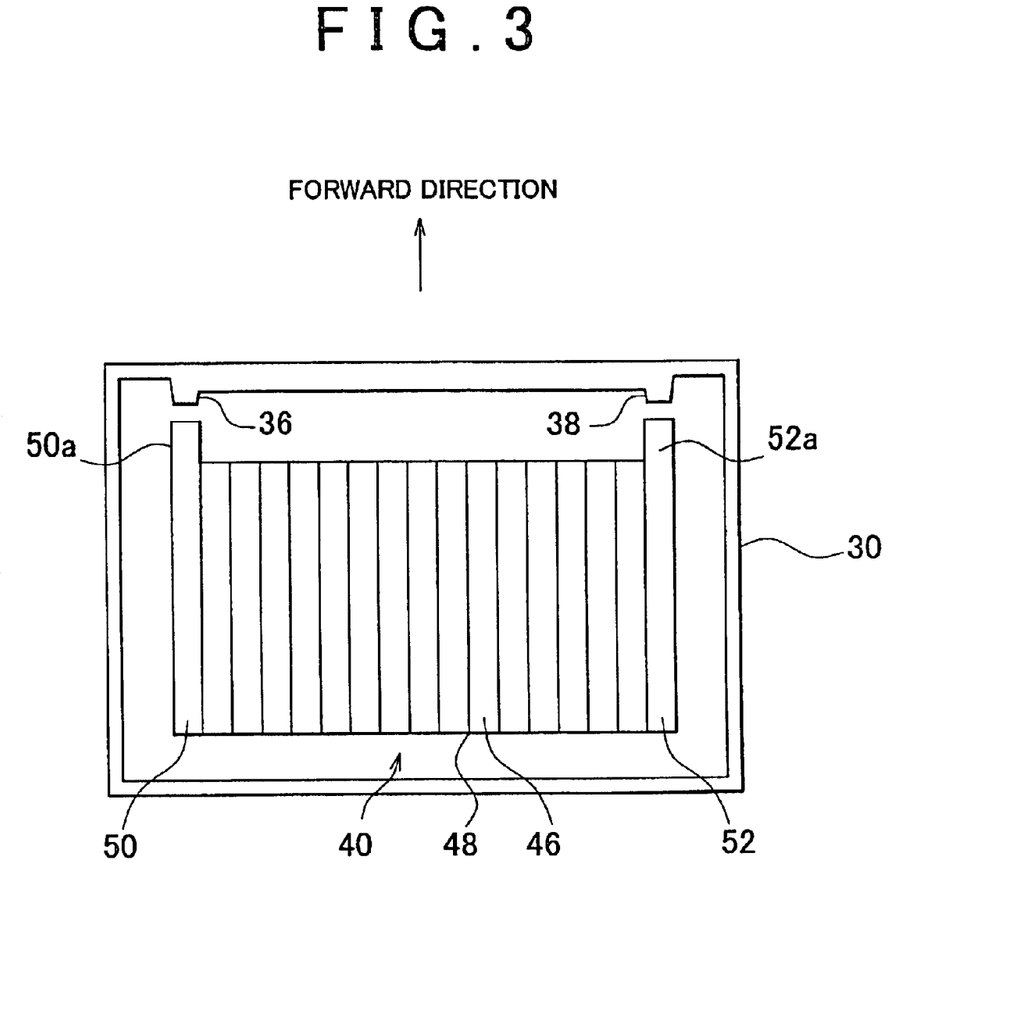
FIG. 3 is a sectional view taken along a horizontal plane represented by line A—A of FIG. 2.

FIG. 3 is a cross section taken along a horizontal plane represented by line A—A of FIG. 2. The battery case 30 includes contact portions 36, 38 corresponding to end portions 50a, 52a each extending from the front end of the end plate 50 or 52 as viewed in the forward direction of the motor vehicle represented by "G" in FIG. 2. In a normal state, each of the contact portions 36, 38 is held apart from the end portions 50a, 52a. When the electric motor vehicle 10 receives an impact (an external force) resulting from a vehicle collision or the like, the battery case 30 may be deformed (specifically, the front surface of the battery case 30 dents) or the fuel cell 40 may be displaced owing to deformation or destruction of the battery mounts 42, 44 (specifically, the fuel cell 40 displaces in the forward direction within the battery case 30). As a result, the contact portions 36, 38 are brought into contact with the corresponding end portions 50a, 52a, respectively.

In an abnormal state owing to an accident such as a vehicle collision where an impact is exerted to the electric motor vehicle 10, the fuel cell 40 and the battery case 30 serving as a resistor are electrically connected, heating the battery case 30. Namely, the electric power generated in the fuel cell 40 is consumed to heat the battery case 30 in the form of thermal energy so as to drop the voltage of the fuel cell 40. The voltage drop of the fuel cell 40 may reduce the risk of human injuries or accidents due to electric leakage. At this time, as the fuel supply to the fuel cell 40 is interrupted by closing the switching valve, it is necessary to consume the electric power generated from the fuel within the fuel supply line downstream of the switching valve (at the position closer to the fuel cell 40) before occurrence of the abnormal state.

The contact portions 36, 38 may be formed on a side of the battery case 30 opposite to the forward direction of the motor vehicle 10. This makes it possible to drop the voltage of the fuel cell 40 so as to assure safety even if the rear surface of the battery case 30 is deformed in the abnormal state.

Figure 4:
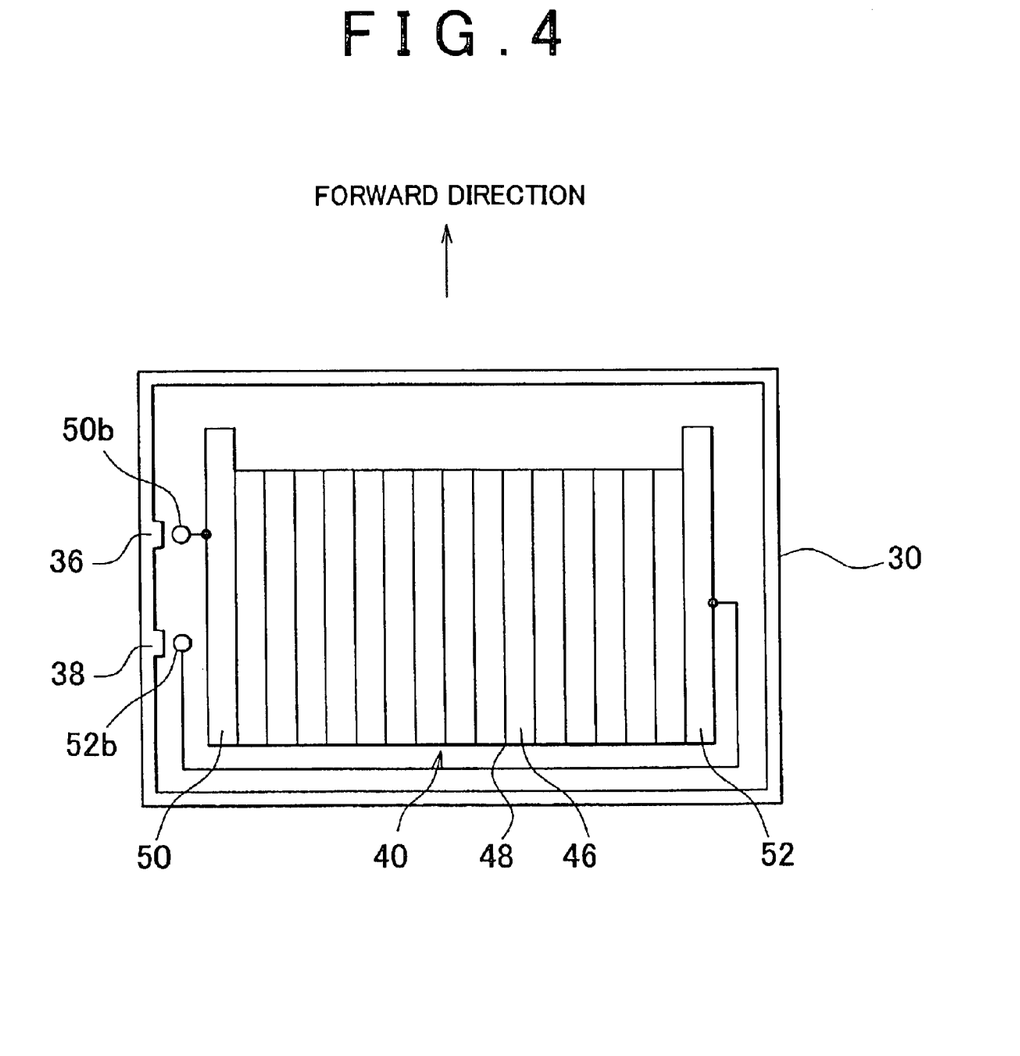
FIG. 4 is a view showing the fuel cell 40 and the battery case 30 when terminals 50b, 52b are arranged on a side of the battery case 30 corresponding to a side portion of the electric motor vehicle 10.

Referring to FIG. 4, each terminal 50b, 52b respectively connected to the end plates 50, 52 may be provided so as to correspond the contact portions 36, 38. This makes it possible to drop the voltage of the fuel cell 40 so as to assure safety even if the side portion of the electric motor vehicle 10 is deformed by the external force.

In the aforementioned embodiments, the fuel cell 40 is electrically connected to the battery case 30 through the end portions 50a, 52a of the end plates 50, 52 or the terminals 50b, 52b connected to the end plates 50, 52 in the event of an accident such as a vehicle collision. The terminal similar to the terminals 50b, 52b may be provided for each of the unit cells 46 so as to drop each voltage thereof.

Figure 6:
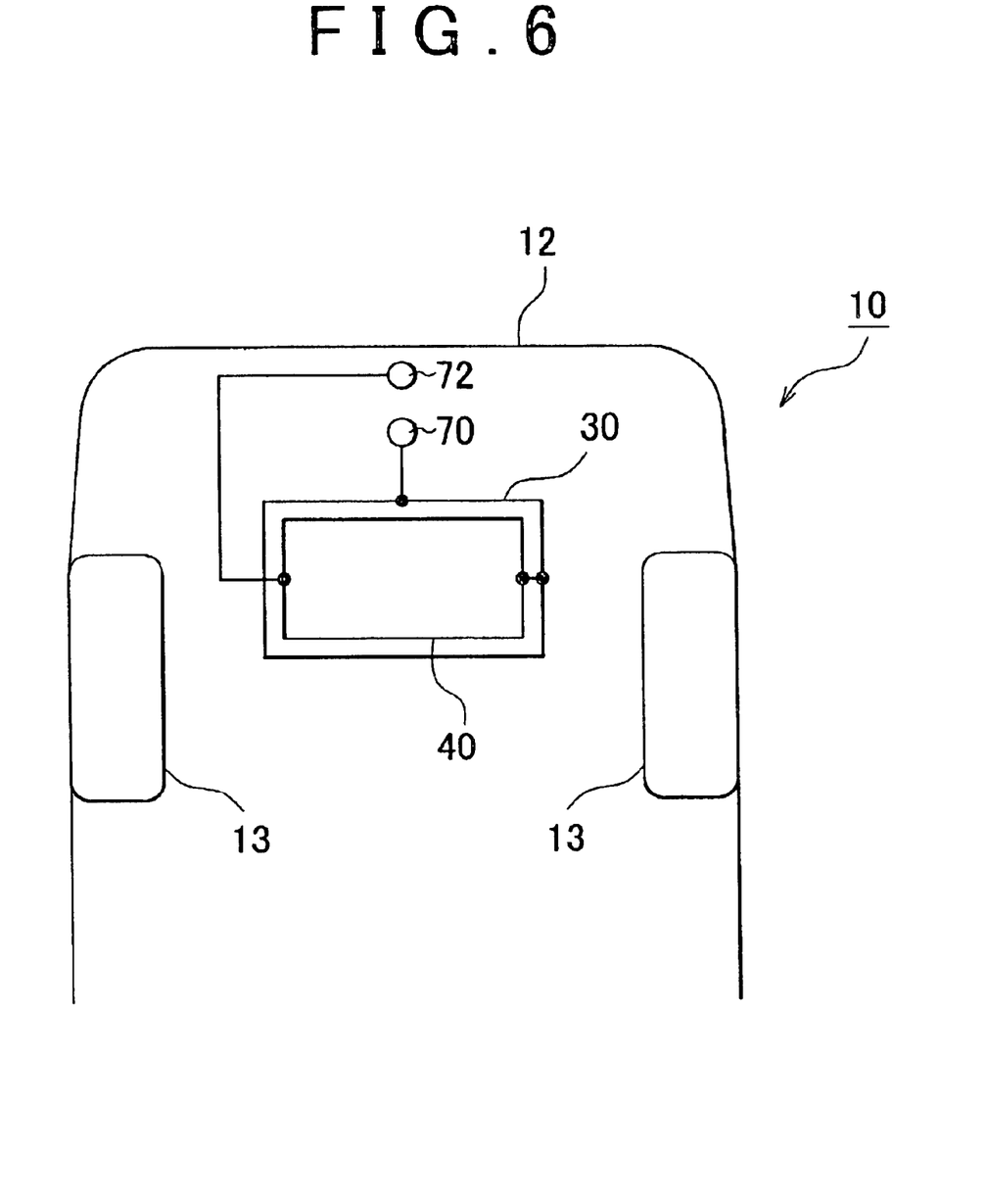
FIG. 6 is a plan view representing a construction of the front portion 12 of the electric motor vehicle 10 according to another embodiment of the invention.

FIG. 6 is a plan view showing a construction of the front portion 12 of the electric motor vehicle 10 according to another embodiment of the invention. As the construction of the front portion 12 of this embodiment is basically the same as that of the first embodiment shown in FIGS. 1 and 2, the description of the same elements and arrangements as those of the first embodiment will be omitted. In the embodiment, terminals 70 and 72 are disposed at a predetermined interval from each other in a front portion of the motor vehicle, for example, in a front bumper of the motor vehicle 10. The terminal 70 is connected to the battery case 30 as a resistor whereas the terminal 72 is connected to the positive electrode of the fuel cell 40. The negative electrode of the fuel cell 40 is connected to the battery case 30. With this arrangement, in the event of a collision of the electric motor vehicle 10, the terminals 70, 72 are brought into contact with each other by the external force exerted to the electric motor vehicle 10, thus consuming the electric power generated in the fuel cell 40 by heating the battery case 30 in the form of thermal energy.

This makes it possible to drop the voltage of the fuel cell 40 for assuring safety if the battery case 30 or the fuel cell 40 is not directly damaged.

Figure 5:
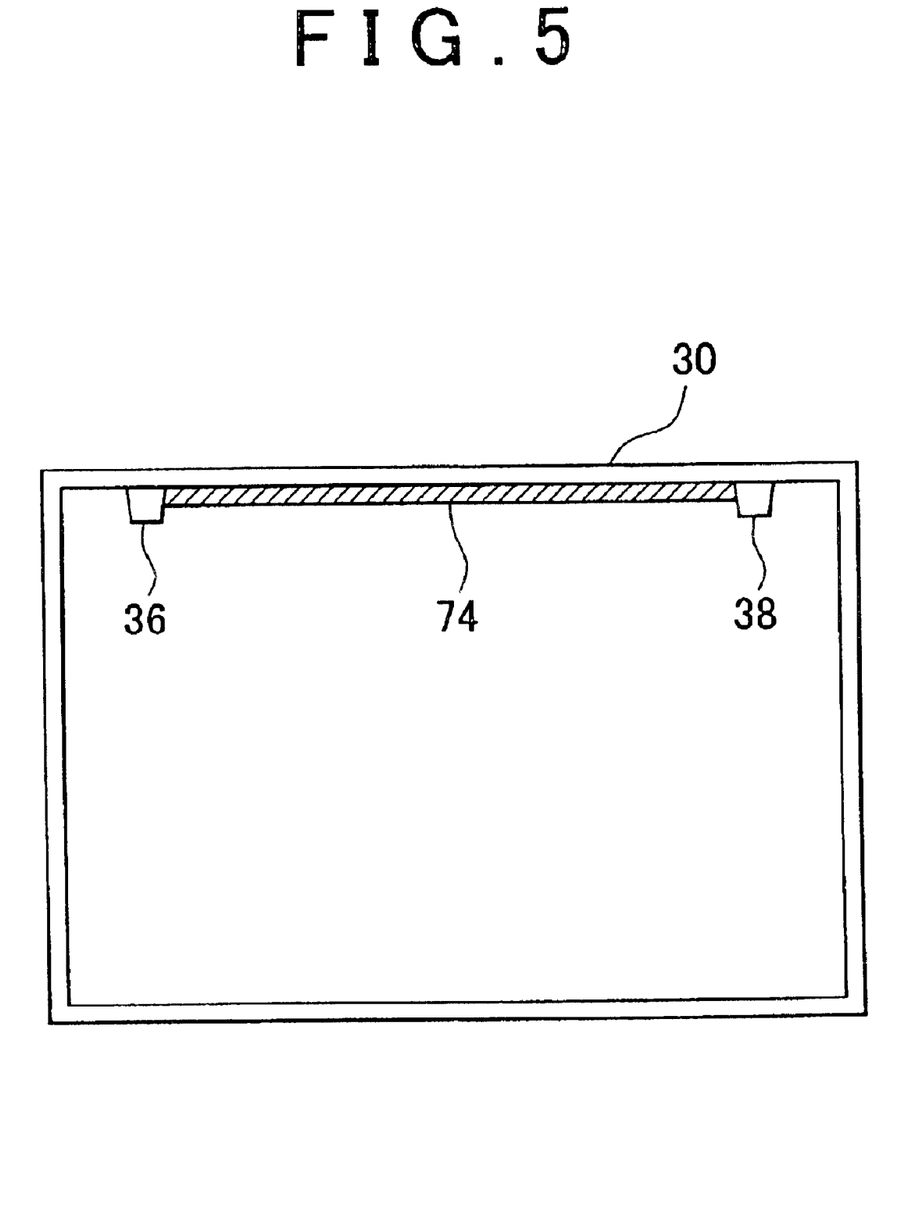
FIG. 5 is a view showing one modified example of the battery case 30.

The battery case 30 is formed of the resistive material in the above-described embodiments. However, as shown in FIG. 5, the battery case 30 may be formed of an insulative material and a resistive member 74 connected to the contact portions 36, 38 may be additionally provided in the battery case 30. Alternatively, the resistive member may be arranged outside of the battery case 30 if such member is provided with safety measure.

Also, while a fuel cell is used as an example of a battery in the above embodiments, the above-described arrangement may be applied to other part or device like a smoothing capacitor and a super capacitor provided in a drive power supply circuit, which maintains voltage even after occurrence of an accident such as a vehicle collision.

According to the invention, as is apparent from the above descriptions, the safety of an electric motor vehicle is improved by reducing the voltage of a power supply mounted on the motor vehicle in the event of an accident.

What is claimed is:

1. An electric motor vehicle comprising:
    a power source that serves to drive the electric motor vehicle; and
    a power consuming device that causes electricity generated by the power source to be consumed upon a collision of the electric motor vehicle.

2. An electric motor vehicle according to claim 1, wherein the power source comprises a battery formed by connecting a plurality of unit cells.

3. An electric motor vehicle according to claim 1, wherein the power consuming device is provided at a position within the electric motor vehicle so as to prevent the power consuming device from being accessed from one of inside and outside of the electric motor vehicle.

4. An electric motor vehicle according to claim 2, wherein the power consuming device is provided at a position within the electric motor vehicle so as to prevent the power consuming device from being accessed from one of inside and outside of the electric motor vehicle.

5. An electric motor vehicle according to claim 2, wherein:
    the power source comprises a fuel cell;
    the power consuming device comprises a stack case formed of a resistor for housing the fuel cell; and
    when the fuel cell is brought into contact with the stack case owing to the collision-of-the electric motor vehicle, electricity generated by the fuel cell is consumed by a resistance of the stack case.

6. An electric motor vehicle according to claim 3, wherein:
    the power source comprises a fuel cell;
    the power consuming device comprises a stack case formed of a resistor for housing the fuel cell; and
    when the fuel cell is brought into contact with the stack case owing to the collision of the electric motor vehicle, electricity generated by the fuel cell is consumed by a resistance of the stack case.

7. An electric motor vehicle according to claim 2, wherein:
    the power source comprises a secondary battery;
    the power consuming device comprises an electrical resistance; and
    when the secondary battery is brought into contact with the electrical resistance owing to the collision of the electric motor vehicle, electricity generated by the secondary battery is consumed.

8. An electric motor vehicle according to claim 3, wherein:
    the power source comprises a secondary battery;
    the power consuming device comprises an electrical resistance; and
    when the secondary battery is brought into contact with the electrical resistance owing to the collision of the electric motor vehicle, electricity generated by the secondary battery is consumed.

9. An electric motor vehicle according to claim 5, wherein a contact portion at which the fuel cell and the stack case contact is located closer to the fuel cell than a switching device that interrupts connection between the fuel cell and a load connected to the fuel cell in case of the collision of the electric motor vehicle.

10. An electric motor vehicle according to claim 7, wherein a contact portion at which the secondary battery and the electrical resistance contact is located closer to the secondary battery than a switching device that interrupts connection between the secondary battery and a load connected to the secondary battery in case of the collision of the electric motor vehicle.

11. An electric motor vehicle comprising:
    a battery that serves as a driving source for generating electric power;
    a pair of positive and negative electrode portions respectively connected to a positive electrode and a negative electrode of the battery;
    a resistor formed of a resistive material; and
    a first and a second contact portions connected to the resistor, the first and the second contact portion facing the positive electrode portion and the negative electrode portion, respectively, wherein:
    the resistor is kept insulated from the battery in a normal operation state of the electric motor vehicle; and
    at least one of the positive electrode, the first contact portion, the negative electrode and the second contact portion are displaced owing to an external force applied to the electric motor in an abnormal operation state such that the positive electrode is in contact with the first contact portion and the negative electrode is in contact with the second contact portion, and into the positive electrode and the negative electrode are short circuited in an abnormal operation state.

12. An electric motor vehicle according to claim 1, further comprising a battery case that houses the battery, wherein the battery case is formed of a resistor.

13. An electric motor vehicle according to claim 11, further comprising a battery case formed of an insulating material, wherein the resistor connected to the first and the second contact portions is attached to one of inside and outside of the battery case.

14. An electric motor vehicle according to claim 12, wherein the positive electrode portion, negative electrode portion, the first contact portion and the second contact portion are housed in the battery case, and provided in one of a front, a side, and a rear direction of the electric motor vehicle.

15. An electric motor vehicle according to claim 11, wherein the positive electrode portion, negative electrode portion, the first contact portion and the second contact portion is provided on a front portion of the electric motor vehicle.

16. An electric motor vehicle according to claim 12, wherein the positive electrode portion, negative electrode portion, the first contact portion and the second contact portion is provided on a front portion of the electric motor vehicle.

17. An electric motor vehicle according to claim 11, wherein:

the battery is formed by stacking a plurality of unit cells, the unit cell being formed of an anode, cathode, and an electrolyte interposed therebetween, and by sandwiching each side of the stacked plurality of unit cells by conductive end plates, and the positive electrode portion and the negative electrode portion are connected to the end plates at each side of the positive electrode and the negative electrode.

* * * * *